June 18, 1968 D. M. OLSON ETAL 3,388,739

HEAT DISSIPATOR

Filed Sept. 7, 1965

INVENTORS
Donald M. Olson
Gordon O. VeneKlasen

Donald E. Payne their attorney

United States Patent Office 3,388,739

Patented June 18, 1968

3,388,739

HEAT DISSIPATOR

Donald M. Olson, 613 Pinon Drive, P.O. Box 2165, and Gordon O. Vene Klasen, 205 Williams, P.O. Box 321, both of Santa Fe County, N. Mex. 87501

Filed Sept. 7, 1965, Ser. No. 485,363

3 Claims. (Cl. 165—80)

ABSTRACT OF THE DISCLOSURE

Stack of staggered, high-mass-to-volume, aluminum elements, each having an accessible cavity at one end, stepped-down annular surfaces at the other end, shallow grooves at its sides, and a radial slot to enable flexing for inserting and holding a transistor in the cavity.

This invention relates to an improved heat dissipator for semiconductor devices such as transistors, diodes, etc. and it pertains more particularly to heat dissipators, also called "heat sinks," which may be mounted in staggered stacked relationship.

Heat sinks heretofore known for insuring the operation of semiconductor devices such as transistors at desired temperatures have usually been provided with fins which increased their bulkiness, have been deficient in obtaining optimum heat exchange contact with the transistor or the like, and have been more or less limited in their usage to plane-surface mountings. An object of this invention is to provide a heat sink which will absorb and dissipate more heat per bulk volume at ordinary temperature levels, which will provide more efficient heat transfer from the transistor to the sink, and which may be efficiently used in stacked positions, so that maximum utilization may be obtained of any available space without unduly decreasing heat dissipating capacity. Other objects will become apparent as the detailed description of the invention proceeds.

Briefly, instead of using fins, we employ a high-mass-to-volume element with a transistor-encasing cavity at one end and with a plurality of stepped-down annular surfaces at the other. The sides of the element are provided with shallow grooves, but not with the fins heretofore used. By providing radial slots extending inwardly through and beyond the walls surrounding the cavity, a sufficient flexing of the cavity walls is made possible to permit insertion and holding of a transistor or the like in the cavity. An aperture extending through the entire height of the cylindrical element adjacent its periphery and parallel to its axis enables a plurality of the elements to be held in stacked but staggered relationship without sacrifice of access to transistor leads or heat dissipation. An aluminum element about 0.7″ in diameter may dissipate about 0.5 watt when its height is about 0.3″ and it may dissipate about a watt when its height is about 1.0.″

The invention will be more clearly understood by reference to the accompanying drawing which forms a part of this disclosure, which illustrates a preferred embodiment of the invention, and in which.

Figures 1, 2:
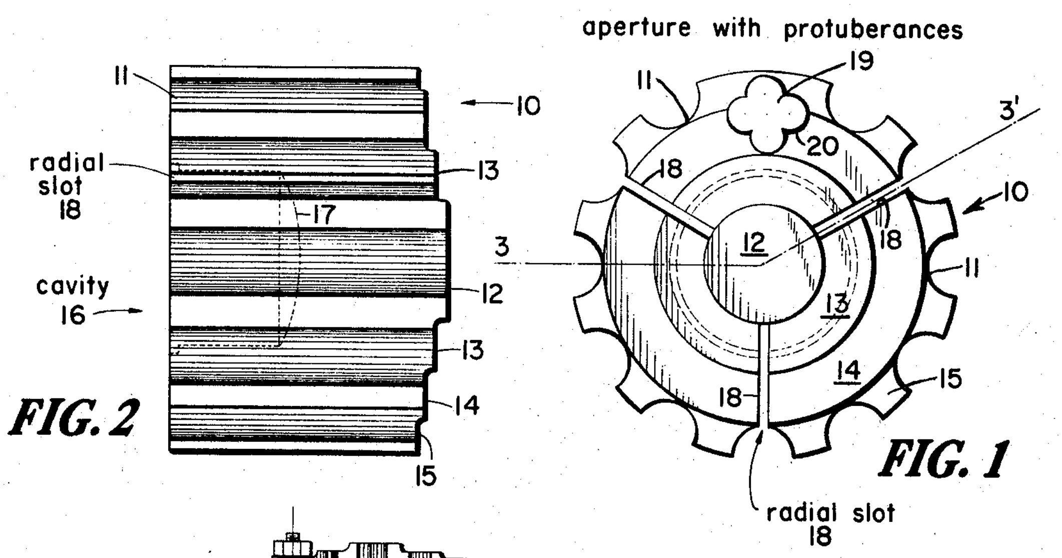
FIG. 1 is a top view of our improved heat sink showing the stepped-down top, the shallow grooves at the circumference, the radial slots, and the aperture.
FIG. 2 is an exterior side view.

The invention will be described as applied to a heat sink for dissipating 0.8 watt when used with a transistor at a temperature level of about 100° F. It should be understood that such heat sinks may be used with other semiconductor devices such as diodes, rectifiers, etc. and may be used for dissipating various amounts of heat.

The heat sink in this example is a substantially cylindrical element 10 of aluminum which has been etched with hot NaOH to increase thermal radiation of its surfaces and which has then been given a hot dip in a solution of $HNO_3 \cdot HF$ to obtain an attractive frosted appearance.

Around the periphery of element 10 are grooves 11 parallel to the axis thereof. In this example the outside diameter of element 10 is 23/32″ (about .720″), the grooves 11 are at 30° intervals except that there is no groove where the aperture is located, and the radius of the grooves is about .063.″ It will thus be noted that the grooves or corrugations 11 are much more shallow than the depth of fins, they are not shaped like fins, and while they do provide extended surface area, their function is to do so while keeping the mass of metal unusually high per bulk volume.

The cylindrical element 10 is ½″ (about .50″) high at the center thereof, but I employ a plurality of stepped-down, substantially flat annular surfaces so that at its outside edge it is only about 29/64″ (about .453″) in height. The flat circular area 12 at the top of the element is 7/32″ (about .219″) in diameter. The first flat annular stepped-down surface 13 has an outside diameter of about 13/32″ (about .406″) and it is 1/64″ (about .016″) below circular area 12. The second flat stepped-down surface 14 has an outside diameter of 9/16″ (about .562″) and it is about 1/32″ (about .031″) below circular area 12. The final flat stepped-down surface 15 extends to the periphery of the element 10 and it is 3/64″ (about .047″) below circular area 12. The use of stepped-down flat annular surface areas increases the available heat-transfer surface area, provides a space for cooling fluid to circulate when such elements are in stacked position, and the roughened top circular surface helps to lock adjacent elements in desired staggered position, as will be hereinafter described.

In the center of the lower end of element 10 we provide a cavity 16 having cylindrical side walls and a curved top 17, the size and shape of cavity 16 being precisely that of the transistor for which the element is designed. To enable the transistor or other semiconductor element to be inserted into the cavity and thereafter to be tightly held in heat-exchange relationship by the walls of the cavity, we provide radial slots 18 at 120° intervals, these slots being about .030 to .035″ deep. Slots 18 extend to a distance of about .110″ from the center axis of element 10 so that they not only go through the walls around cavity 16 but they extend inwardly substantially further. These slots enable the lower walls of the element to be slightly flexed for the insertion of the transistor even when it deviates slightly from its design size and shape.

Figures 4, 5:
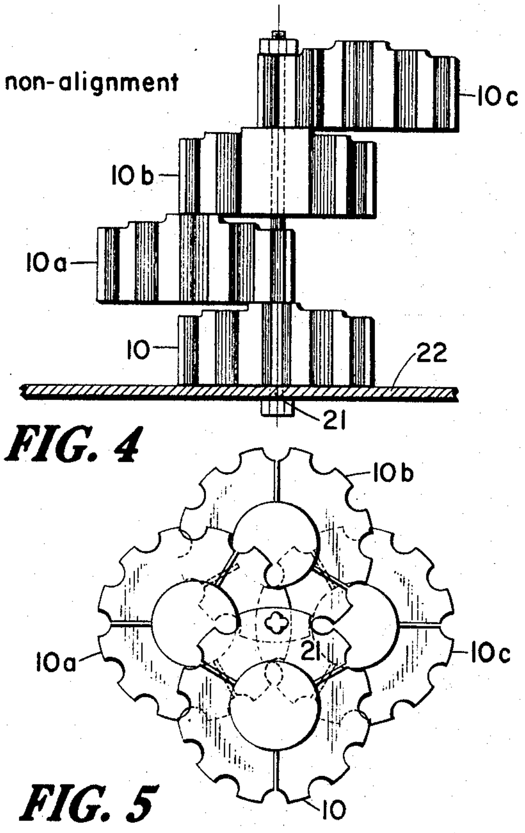
FIG. 4 is a side view of a staggered stack of our heat sinks.
FIG. 5 is a bottom view of the staggered stacked heat sinks.
Figure 3:
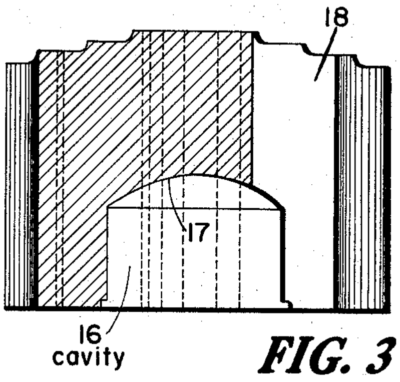
FIG. 3 is a section view taken along the lines 3—3 of FIG. 1.
Figure 6:
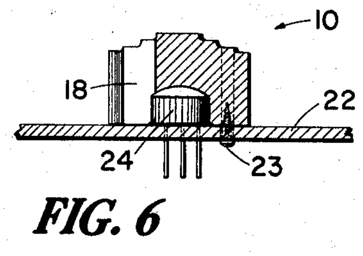
FIG. 6 is a sectional view of a heat sink mounted with a self-tapping screw.

In that portion of the periphery in which there is no groove we provide an aperture 19 which extends through the entire height of element 10. While aperture 19 may be circular with a diameter of about .090″ and with its center about .281″ from the central axis of element 10, it is preferably provided with slits, protuberances, or grooves 20 which facilitate the use of tie member such as self-tapping screws for mounting the elements on desired supports and which may fit over a rod or bolt of corresponding cross-section for holding each element in a stack in staggered relationship with elements adjacent thereto. In FIG. 4 and FIG. 5 we show a bolt 21 having a cross-section corresponding to the shape of aperture 19 (as modified by 20) holds elements 10, 10*a*, 10*b* and 10*c* in stacked staggered relationship at 90° intervals on base 22 so that the leads from each semiconductor device are readily accessible and at the same time the tops and bottoms of adjacent heat sink elements are exposed to cooling fluid such as air. By having the tops and bottoms of elements 10 roughened, the clamping of adjacent elements together by a bolt or the like may hold them in desired staggered relationship even when cross-section of the bolt is circular. In FIG. 6 we show how our heat sink element 10 may be held on a support 22 by a self-tapping screw 23, the transistor 24 itself being shown in this case.

While a preferred embodiment of the invention has been described in minute detail, other examples and modifications will be apparent from the foregoing description to those skilled in the art. Instead of being circular in cross-section the elements may be hexagonal, etc., or even square, the important consideration being that the element have a high mass-to-volume ratio since at ordinary temperatures the fins heretofore used are far less effective than heat conduction made possible by our arcuate shallow grooves. The stepped-down annular surfaces may be of different configuration provided that they perform the same functions. The radial slots may be more numerous, may be spaced at 90° angles instead of 120° angles, etc. The exposed surfaces of the elements may be anodized or otherwise treated or colored for improving heat transfer.

We claim:

1. A heat dissipator assembly for semiconductor devices which comprises:

(a) high-mass-to-volume elements of heat-conducting metal each having an axis surrounded by side walls and provided with a lower cavity shaped and sized to fit in heat exchange relationship over and around a semiconductor device, (b) the side walls of the elements being provided with radial slots extending inwardly through and beyond the walls surrounding the lower cavity to enable slight flexing of the cavity walls to permit insertion and holding of a semiconductor device in the cavity, (c) an aperture extending through the entire height of the elements adjacent the periphery and parallel to the axis thereof, said aperture being designed to receive a tie member, and (d) a tie member being used with a plurality of said elements and holding them in stacked and staggered relationship so that leads from each device will all be available for connections and so that tops and bottoms of the elements will be air-cooled as well as sides thereof.

2. The heat dissipator assembly of claim 1 in which each element is substantially cylindrical, is made of aluminum, and is about 0.7″ in diameter and about 0.3″ to 1.0″ in height when the heat to be dissipated is about 0.5 to 1.0 watt.

3. The heat dissipator assembly of claim 2 in which the upper end of each cylindrical element has a small flat rough circular top and a plurality of stepped-down, annular surfaces and in which the periphery of the cylindrical element is provided with shallow grooves.

References Cited

UNITED STATES PATENTS

| | | | |
|---|---|---|---|
| 2,653,181 | 9/1953 | Millett | 174—35 |
| 2,879,977 | 3/1959 | Trought | 165—80 |
| 2,917,286 | 12/1959 | Deakin | 165—80 |
| 2,935,666 | 5/1960 | Van Namen | 317—234 |
| 2,964,688 | 12/1960 | McAdam | 317—234 |
| 3,146,384 | 8/1964 | Ruehle | 317—234 |
| 3,213,336 | 10/1965 | McAdam | 317—234 |
| 3,305,704 | 2/1967 | Battisa | 317—100 |

FOREIGN PATENTS

| | | |
|---|---|---|
| 767,963 | 2/1957 | Great Britain. |
| 985,671 | 3/1965 | Great Britain. |

ROBERT A. O'LEARY, *Primary Examiner.*

A. W. DAVIS, *Assistant Examiner.*